US012435390B2

(12) United States Patent
Vincent et al.

(10) Patent No.: US 12,435,390 B2
(45) Date of Patent: Oct. 7, 2025

(54) TIMEPIECE, PIECE OF JEWELLERY OR GEMSTONE JEWELLERY MADE OF GOLD

(71) Applicant: MONTRES BREGUET SA, L'Abbaye (CH)

(72) Inventors: Denis Vincent, Neuchatel (CH); Stéphane Lauper, Cortaillod (CH); Gregory Kissling, La Neuveville (CH)

(73) Assignee: MONTRES BREGUET SA, L'Abbaye (CH)

( * ) Notice: Subject to any disclaimer, the term of this patent is extended or adjusted under 35 U.S.C. 154(b) by 202 days.

(21) Appl. No.: 18/252,144

(22) PCT Filed: Jul. 23, 2021

(86) PCT No.: PCT/EP2021/070732
§ 371 (c)(1),
(2) Date: May 8, 2023

(87) PCT Pub. No.: WO2022/128178
PCT Pub. Date: Jun. 23, 2022

(65) Prior Publication Data

US 2023/0407438 A1 Dec. 21, 2023

(30) Foreign Application Priority Data

Dec. 18, 2020 (EP) .................................... 20215708

(51) Int. Cl.
*C22C 5/02* (2006.01)
*A44C 27/00* (2006.01)
*G04B 37/22* (2006.01)

(52) U.S. Cl.
CPC .............. *C22C 5/02* (2013.01); *A44C 27/003* (2013.01); *G04B 37/22* (2013.01)

(58) Field of Classification Search
CPC .......... C22C 5/02; A44C 27/003; G04B 37/22
See application file for complete search history.

(56) References Cited

U.S. PATENT DOCUMENTS

2015/0071814 A1 3/2015 Feinberg et al.
2019/0368005 A1 12/2019 Dubach et al.
2020/0383439 A1 * 12/2020 Arnaboldi ............ A44C 27/003

FOREIGN PATENT DOCUMENTS

CH 705 653 B1 4/2013
CH 715 061 A2 12/2019
(Continued)

OTHER PUBLICATIONS

International Search Report issued Dec. 2, 2021 in PCT/EP2021/070732 filed on Jul. 23, 2021, 2 pages.
(Continued)

*Primary Examiner* — Sally A Merkling
*Assistant Examiner* — Danny N Kang
(74) *Attorney, Agent, or Firm* — Oblon, McClelland, Maier & Neustadt, L.L.P.

(57) ABSTRACT

A gold alloy may contain, by weight, between 73% and 77% of gold, between 5% and 11% of silver, between 1% and 7% of palladium, and between 10% and 18% of copper. The gold alloy may include iridium, rhenium, and/or ruthenium in up to 0.05 wt. %. The gold alloy may have an a* value in a range of from 3 to 9, and a b* value in a range of from 12 to 18, in CIELAB color space. A timepiece, piece of jewelry, or gemstone jewelry, may be made of such a gold alloy.

20 Claims, 1 Drawing Sheet

(56) References Cited

FOREIGN PATENT DOCUMENTS

| | | | |
|---|---|---|---|
| CH | 715 203 | A1 | 1/2020 |
| JP | 60-258435 | A | 12/1985 |
| JP | 10-245646 | A | 9/1998 |
| WO | WO 2019/175826 | A1 | 9/2019 |

OTHER PUBLICATIONS

Office Action issued Jun. 11, 2024, in corresponding Japanese Patent Application No. 2023-536392 (with English Translation), 10 pages.

* cited by examiner

TIMEPIECE, PIECE OF JEWELLERY OR GEMSTONE JEWELLERY MADE OF GOLD

CROSS-REFERENCE TO RELATED APPLICATIONS

The present application is the national stage of international application PCT/EP2021/070732, filed on Jul. 23, 2021, and claims the benefit of the filing date of European Appl. No. 20215708.7, filed on Dec. 18, 2020.

FIELD OF THE INVENTION

The invention relates to an 18-carat gold alloy with an attractive bronze hue and improved tarnish resistance.

The invention further relates to a timepiece, piece of jewellery or gemstone jewellery made of this gold alloy.

BACKGROUND OF THE INVENTION

A zinc-free 9-carat gold alloy is known from the European patent application No. 19193469 and contains by weight between 37.5% and 38.5% gold, palladium and/or silver with a total percentage between 4% and 32%, between 25% and 54% copper and between 0% and 10% gallium. This alloy has good deformability as well as improved stress corrosion resistance and tarnish resistance. It further has an attractive bronze-like hue without the drawbacks linked to the oxidation of this material.

Although having improved tarnish resistance compared to standard 9-carat gold alloys, some tarnishing may be observed over time. This tarnishing alters the beautiful bronze-like hue of the pieces made from this alloy.

SUMMARY OF THE INVENTION

The purpose of the present invention is to develop a gold alloy that has the same bronze hue as the 9-carat gold alloy of the prior art, with improved tarnish resistance.

The chemical composition of the gold alloy has been adapted for this purpose. The gold alloy thus developed is an 18-carat alloy containing silver, palladium and copper.

More specifically, the gold alloy contains, by weight, between 73% and 77% gold, between 5% and 9.9% silver, between 1% and 4.9% palladium, and between 10% and 18% copper.

Advantageously, the invention relates to a gold alloy consisting, by weight, of 73% to 77% gold, of 5% to 9.9% silver, of 1% to 4.9% palladium, of 10% to 18% copper and of 0 to 0.05% of one or more elements selected from among iridium, rhenium and ruthenium.

According to specific embodiments of the invention, the gold alloy has one of the following features or an appropriate combination thereof:

- it contains, by weight, between 73.5% and 77% gold, between 5.5% and 9.9% silver, between 1.5% and 4.9% palladium, and between 11% and 18% copper;
- it contains, by weight, between 73.5% and 76.5% gold, between 5.5% and 9.9% silver, between 1.5% and 4.9% palladium, and between 11% and 16% copper;
- it contains, by weight, between 74% and 76.5% gold, between 6% and 9.9% silver, between 2% and 4.9% palladium, and between 12% and 16% copper;
- it contains, by weight, between 74% and 76% gold, between 6% and 9.5% silver, between 2% and 4.9% palladium, and between 12% and 15.5% copper;

- it contains, by weight, a maximum of 0.05% of one or more elements selected from among iridium, rhenium and ruthenium;
- it has, in the CIELAB colour space, an a* value between 3 and 9 and a b* value between 12 and 18;
- it has, in the CIELAB colour space, an a* value between 5.5 and 8 and a b* value between 14 and 17;
- it has, in the CIELAB colour space, an L value between 80 and 90;
- it has a hardness HV1 of between 140 and 185, preferably of between 155 and 180.

The present invention further relates to the timepiece, piece of jewellery or gemstone jewellery made of this alloy.

During use, it has been found that timepieces, pieces of jewellery or gemstone jewellery made with this alloy have improved resistance to tarnishing over time compared to pieces made with the aforementioned 9-carat alloy. They also have improved tarnish resistance compared to pieces made with other 18-carat alloys.

In terms of hue, the 9-carat alloy according to the prior art and the 18-carat alloy according to the present invention have a hue perceived by the eye as similar.

Further features and advantages of the present invention will become apparent in the following description of a preferred embodiment, given by way of a non-limiting example with reference to the accompanying drawings.

DESCRIPTION OF THE INVENTION

Figure 1:
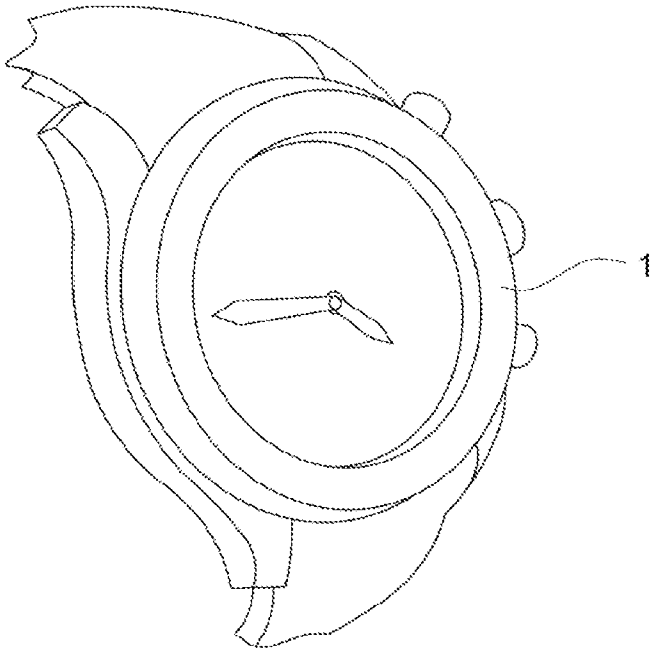
FIG. 1 shows a timepiece comprising a middle made with the gold alloy according to the invention.

The present invention relates to an 18-carat gold alloy more particularly intended for application in the horology, jewellery or gemstone jewellery field. It thus further relates to the timepieces, pieces of jewellery or gemstone jewellery made of this alloy. The term 'timepieces' is understood to mean both external components such as a middle, a back, a bezel, a push-piece, a bracelet link, a dial, a hand, or a dial index, etc., and components of the movement such as a plate, a bridge or a balance. By way of illustration, the timepiece is a middle 1 as shown in FIG. 1.

The gold alloy according to the invention contains, by weight, between 73% and 77% gold, between 5% and 11% silver, between 1% and 4.9% palladium, and between 10% and 18% copper. This alloy is free of nickel, cobalt, iron and manganese.

Advantageously, the gold-based alloy contains, by weight, between 73.5% and 77% gold, between 5.5% and 9.9% silver, between 1.5% and 4.9% palladium, and between 11% and 18% copper.

Preferably, the gold-based alloy contains, by weight, between 73.5% and 76.5% gold, between 5.5% and 9.9% silver, between 1.5% and 4.9% palladium, and between 11% and 16% copper.

More preferably, the gold-based alloy contains between 74% and 76.5% gold, between 6% and 9.9% silver, between 2% and 4.9% palladium, and between 12% and 16% copper.

In a particularly preferred manner, the gold-based alloy contains, by weight, between 74% and 76% gold, between 6% and 9.5% silver, between 2% and 4.9% palladium, and between 12% and 15.5% copper.

Moreover, the gold-based alloy contains, by weight, between 0 and 0.05% (inclusive) of one or more elements selected from among iridium, rhenium and ruthenium, the range 0-0.05% covering the total percentage of the one or more of these elements. Advantageously, the alloy contains, by weight, 0.0025% iridium.

To prepare the gold alloy, the various elements of the composition are melted down before being cast. The casting ingot is then deformed with a work hardening rate greater than or equal to 75% distributed in several passes with intermediate anneals carried out in a temperature range of between 550° C. and 750° C., for a time of between 5 minutes and 30 minutes.

In the examples hereafter, the samples are annealed at a temperature of 650° C. for 30 minutes. After cooling, the blanks are dimensioned, for example by machining.

The alloys obtained after deformation and annealing have, in the CIELAB colour space (in accordance with standards CIE No. 15, ISO 7724/1, DIN 5033 Teil 7, ASTM E-1164) an a* value between 3 and 9, preferably between 5.5 and 8, and a b* value between 12 and 18, preferably between 14 and 17, the a* and b* values together defining the hue of the alloy. They also have an L value between 80 and 90, the La*b* values together defining the colour of the alloy. According to the present invention, the focus is more specifically on the a* and b* values which define the hue of the alloy.

These alloys have a hardness of between 140 and 185 HV1, preferably of between 155 and 180 HV1.

Table 1 shows the composition by weight of a reference 9-carat gold alloy from the European patent application No. 19193469 and of five 18-carat gold alloys according to the invention. The measured colorimetric values and the measured hardness (HV1) are also set out in Table 1. The L*a*b* colorimetric values were measured with a KONICA MINOLTA CM-2600d spectrophotometer with a D65 illuminant and an observation angle of 10°. The Delta E and Delta C values respectively represent the colour difference and the chroma difference, with respect to the 9K reference. The Delta E is calculated on the basis of the La*b* values as follows, where $L_{ref}$, $a^*_{ref}$ and $b^*_{ref}$ refer to the values of the reference 9-carat gold alloy:

$$\Delta E=[(L_{ref}-L)+(a^*_{ref}-a^*)^2+(b^*_{ref}-b^*)^2]^{1/2}$$

Figure 2:
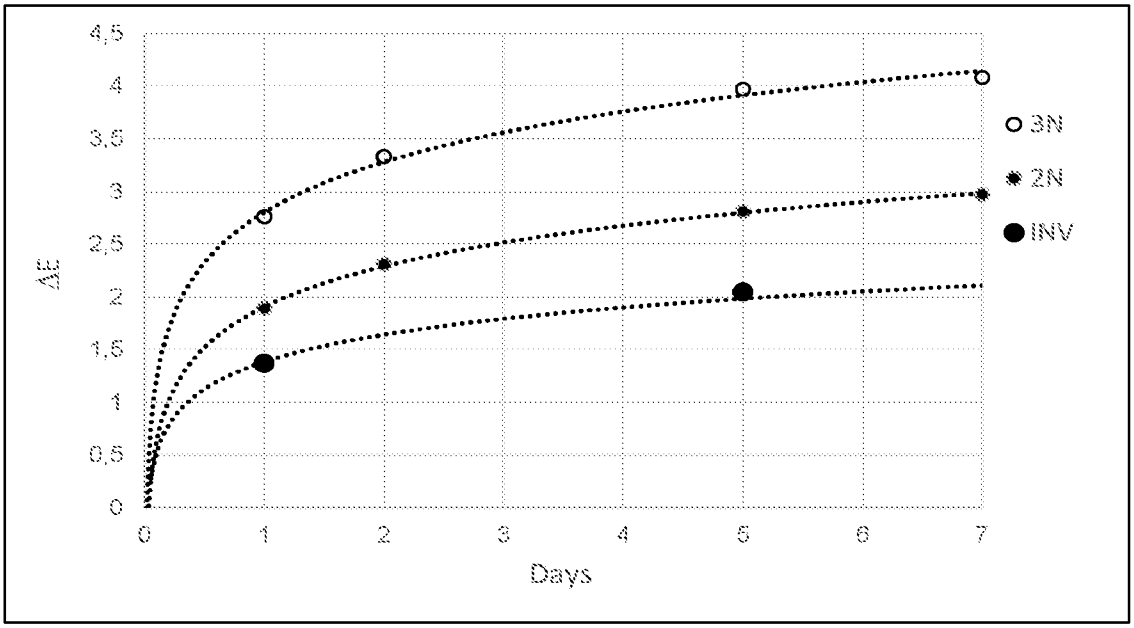
FIG. 2 shows the discolouration curves for the alloy according to the invention (INV) and for two 18-carat alloys (2N, 3N) according to the prior art.

The Delta C is calculated on the basis of the a*b* values as follows:

$$\Delta C=[(a^*_{ref}-a^*)^2+(b^*_{ref}-b)^2]^{1/2}$$

days. The 18-carat gold alloys according to the invention maintain their attractive bronze hue without tarnishing, in contrast to the 9-carat gold alloy according to the prior art, which tarnishes substantially. Moreover, comparative discolouration tests were carried out between the 18-carat gold alloy according to the invention and two 18-carat gold alloys according to the prior art, namely the alloy 2N, which contains, by weight, 75% gold, 16% silver and 9% copper, and the alloy 3N, which contains, by weight, 75% gold, 12.5% copper and 12.5% silver. The discolouration tests were carried out by immersing the samples in a water solution saturated with sodium chloride at 70° C. for several days. Discolouration, defined by Delta E, was monitored by colorimetry measurements carried out under the same conditions as those described hereinabove. As shown in FIG. 2, the new gold alloy shows a significant improvement in discolouration resistance compared to the 18-carat gold alloys 2N and 3N of the prior art.

The alloys according to the invention have a hardness HV1 in the annealed state of between 158 and 175, allowing them to be easily deformed.

The new gold alloy thus has an attractive bronze hue with lower tarnishing over time.

The invention claimed is:

1. A gold alloy, consisting of, by weight:
gold in a range of from 73 to 77%;
silver in a range of from 5 to 9.9% silver;
palladium in a range of from 1 to 4.9%;
copper in a range of from 10 to 18%; and
optionally, iridium, rhenium, and/or ruthenium in up to 0.05%.

2. The gold alloy of claim 1, wherein, by weight:
the gold is present in a range of from 73.5 to 77%;
the silver is present in a range of from 5.5 to 9.9%;
the palladium is present in a range of from 1.5 to 4.9%; and
the copper is present in a range of from 11 to 18%.

3. The gold alloy of claim 1, wherein, by weight:
the gold is present in a range of from 73.5 to 76.5%;
the silver is present in a range of from 5.5 to 9.9%;
the palladium is present in a range of from 1.5 to 4.9%; and
the copper is present in a range of from 11 to 16%.

4. The gold alloy of claim 1, comprising, by weight:
the gold is present in a range of from 74 to 76.5%;
the silver is present in a range of from 6 to 9.9%;
the palladium is present in a range of from 2 to 4.9%; and
the copper is present in a range of from 12 to 16%.

TABLE 1

| | Compositions (% poids) | | | | | Colorimétrie La*b* D65 10° | | | Δ de couleur (La*b*) | Δ chromatique (a*b*) | Dureté |
|---|---|---|---|---|---|---|---|---|---|---|---|
| | Au. | Ag. | Pd. | Cu. | Ga | L | a* | b* | Delta E | Delta C | [HV1] |
| 9K référence | 37.6 | 6.4 | 2 | 50 | 4 | 87.1 | 6.7 | 15.0 | 0.00 | 0.00 | 131 |
| 18K | 75.1 | 5.4 | 2.0 | 17.6 | 0 | 85.6 | 7.8 | 15.3 | 1.89 | 1.11 | 165 |
| invention | 75.1 | 5.4 | 2.0 | 17.6 | 0 | 85.9 | 7.7 | 15.3 | 1.58 | 1.02 | 175 |
| | 75.1 | 7.1 | 2.6 | 15.2 | 0 | 85.7 | 6.9 | 15.4 | 1.42 | 0.42 | 161 |
| | 75.1 | 7.3 | 2.0 | 15.6 | 0 | 86.0 | 7.2 | 16.4 | 1.88 | 1.50 | 169 |
| | 75.1 | 7.1 | 3.3 | 14.6 | 0 | 86.0 | 6.4 | 14.7 | 1.22 | 0.43 | 158 |

The values of a* and b* are very close, with a* values between 6.4 and 7.8 for a reference value of 6.7, and with b* values between 14.7 and 16.4 for a reference value of 15. To the naked eye, the reference and the gold alloys according to the invention have the same bronze hue. Tarnishing was assessed visually after exposure to ambient air for several

5. The gold alloy of claim 1, wherein, by weight:
the gold is present in a range of from 74 to 76%;
the silver is present in a range of from 6 to 9.5% silver;
the palladium is present in a range of from 2 to 4.9%; and
the copper is present in a range of from 12 to 15.5%.

6. The gold alloy of claim 1, wherein, by weight:

the iridium, rhenium, and/or ruthenium is present in a range of from more than 0 to 0.05%.

7. The gold alloy of claim 1, having, in CIELAB color space, an a* value in a range of from 3 to 9, and a b* value in a range of from 12 to 18.

8. The gold alloy of claim 1, having, in CIELAB color space, an a* value in a range of from 5.5 to 8, and a b* value in a range of from 14 to 17.

9. The gold alloy of claim 1, having, in CIELAB color space, an L value in a range of from 80 to 90.

10. The gold alloy of claim 1, having a hardness HV1 in a range of from 140 to 185.

11. A timepiece, piece of jewelry, or gemstone jewelry, comprising:

the gold alloy of claim 1.

12. The gold alloy of claim 1, having a hardness HV1 in a range of from 155 to 180.

13. The gold alloy of claim 1, wherein the gold alloy has, in CIELAB color space, an a* value in a range of from 5.5 to 8, a b* value in a range of from 14 to 17, and an L value in a range of from 80 to 90, and wherein the gold alloy has a hardness HV1 in a range of from 155 to 180.

14. The gold alloy of claim 1, wherein the silver is in a range of from 5.5 to 9.9% silver.

15. A gold alloy, comprising, by weight:

the gold in a range of from 73 to 77%;

the silver in a range of from 5.4 to 9.9% silver;

the palladium in a range of from 1 to 4.9%;

the copper in a range of from 10 to 18%; and optionally, iridium, rhenium, and/or ruthenium in up to 0.05%, wherein the gold alloy has, in CIELAB color space, an a* value in a range of from 5.5 to 8, a b* value in a range of from 14 to 17, and an L value in a range of from 80 to 90, and wherein the gold alloy has a hardness HV1 in a range of from 155 to 180.

16. The gold alloy of claim 15, comprising the iridium, rhenium, and/or ruthenium.

17. The gold alloy of claim 15, comprising the silver in a range of from 5.5 to 9.9% silver.

18. The gold alloy of claim 15, comprising the silver in a range of from 6.0 to 9.9% silver.

19. The gold alloy of claim 15, comprising the silver in a range of from 7.1 to 9.9% silver.

20. The gold alloy of claim 15, comprising, by weight:

the gold in a range of from 73.5 to 77% gold, the silver in a range of from 5.5 to 9.9%, the palladium in a range of from 1.5 to 4.9%, and the copper in a range of from 11 to 18%.

* * * * *